W. H. Sollenberger,
Band Saw Mill.
Nº 31,768. Patented Mar. 19, 1861.
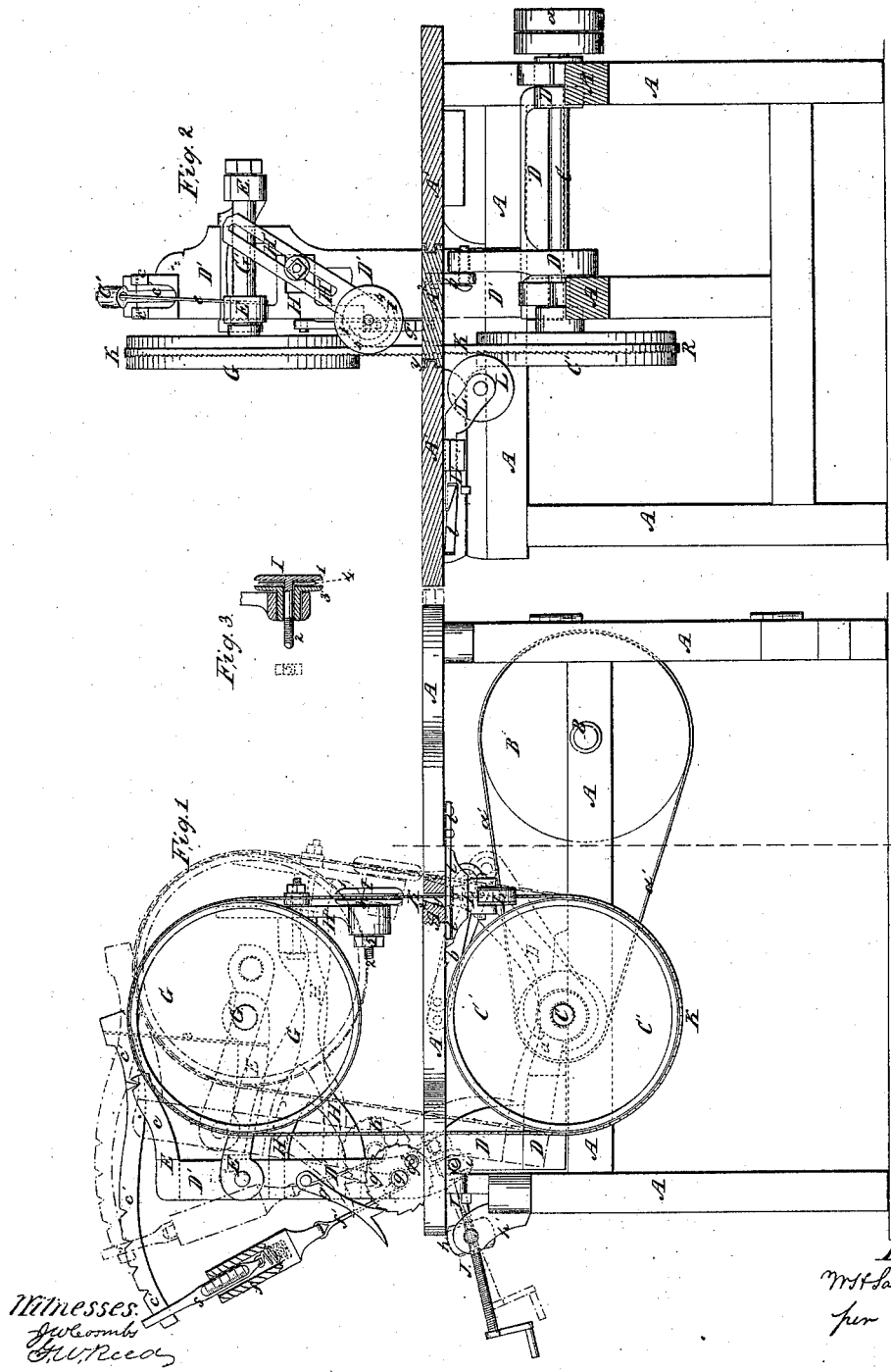
Witnesses:
Inventor:
W. H. Sollenberger
per Munn & Co
Attorneys

UNITED STATES PATENT OFFICE.

W. H. SULLENBERGER, OF CHAMBERSBURG, PENNSYLVANIA, ASSIGNOR TO HIMSELF, HENRY SIERER, AND JOHN TOLBERT, OF SAME PLACE.

IMPROVED METHOD OF HANGING BAND-SAWS.

Specification forming part of Letters Patent No. 31,768, dated March 19, 1861.

*To all whom it may concern:*

Be it known that I, W. H. SULLENBERGER, of Chambersburg, in the county of Franklin and State of Pennsylvania, have invented certain new and useful Improvements in Hanging and Operating Belt-Saws; and I do hereby declare that the following is a full, clear, and exact description thereof, reference being had to the accompanying drawings, making a part of this specification, in which—

Figure 1 is a front elevation of the improved machine, representing in red lines the severable movable parts in their relative positions for sawing beveled work. Fig. 2 is a transverse section taken in the vertical plane indicated by the red line $x\ x$ in Fig. 1. Fig. 3 is a longitudinal section through the grooved guide-wheel.

Similar letters of reference indicate corresponding parts in the three figures.

This invention and improvement in saws known as the "belt-saw" relates to a novel manner of hanging the saw so as to compensate for its expansion and contraction under different degrees of temperature, and thus to keep up a proper degree of tension on the saw for driving it through the work with ease, whether the saw be cold or heated.

The invention relates, secondly, to a novel manner of hanging the upper belt-wheel in combination with a movable slide in the table, whereby the saw may be adjusted and set to saw any irregular or straight bevel.

It relates, thirdly, to a novel means for preventing injury to the saw-teeth in consequence of their running on the peripheries of belt-wheels.

It relates, fourthly, to the application of a yielding gutta-percha wheel to the toothed edge of the saw under the table for the purpose of preventing the saw from being worked off the belt-wheels when the work is drawn backward from the saw, as will be hereinafter explained.

It relates, fifthly, to a novel guide-wheel which prevents the saw from twisting, and serves as a back-rest for the saw in sawing, and which is so constructed that it can be well adapted to saws of different widths, as will be hereinafter described.

To enable those skilled in the art to make and use my invention I will proceed to describe its construction and operation.

A is the frame-work, and A' is the bed or table for containing and supporting the several operating parts of the machine.

B is the driving-shaft, and B' the belt-pulley on this shaft, which transmits a rotary motion to the pulley $a$ on the lower belt-wheel shaft C through the medium of belt $a'$. (Shown in Fig. 1.) The horizontal shaft C has its bearings on the two longitudinal bars A A of the table-frame, and passes transversely across these two bars, as shown in Fig. 2. On the end of shaft C, opposite to the pulley $a$, is keyed the lower belt-wheel C', which rotates with the shaft C.

D is a forked lever which has its fulcrum on the shaft C of the belt-wheel C', between the two longitudinal bars A A', and one of the arms of this lever D extends beyond the shaft C and is curved upward, and this curved end is connected to the sliding portion $A^2$ of table A' by a jointed connecting-bar $b$, so that when the lever D is rocked back and forth the slide $A^2$ will receive an endwise movement, as will be hereinafter more fully described.

D' is a standard or cast-iron support for the upper belt-wheel-carrying arms E E, which standard is secured to and projects a suitable distance from one end of the lever D above the table A'. On the top of this standard D' is secured a fulcrum-arm $c$ for supporting the scale-beam $c'$, and below this arm $c$ and pivoted to the standard D' are the arms E E for supporting the upper belt-wheel G, which arms E E project from the standard D' over the table A'. The upper belt-wheel G is on the end of a horizontal transverse shaft G', which has its bearings in the ends of the jointed arms E E, and the wheel G is held in the vertical plane of the lower belt-wheel C'. The jointed wheel-frame or arms E E are held up and supported by a rod $e$, scale-beam $c'$, spring-balance $f$, strap $f'$, roller $g$, and pawl and ratchet $g'$, as will be hereinafter fully explained.

H is an arm or bracket, which is fixed rigidly to the standard D' and projects out at right angles from this standard beyond the end of arms E E and under these arms. This bracket H carries on its end a slotted bar H′, which is adjustable in a direction with its length and which has a bearing in one end for the guide-wheel I, Figs. 1, 2, and 3.

J is a screw which passes through a rocking nut $h$, which has its bearings in the brackets $h'$, Fig. 1, and through a rocking piece $i$, which has its bearings in the standard D′. The end of screw J is attached to the piece $i$, so that by turning this screw the entire frame D D′ and the parts which are attached to it will be moved concentrically with the shaft C. The object of allowing this movement to be given to the standard D′ and lever D is to give the belt-saw K any desired angle or inclination from a line perpendicular to the top of table A′ for the purpose of sawing beveled work.

The rod $e$ is connected to the short arm of the scale-beam $c'$, and this scale-beam has a knife-edge bearing on the end of the arm $c$, the end of which is elevated above the top of standard D′, as shown in Fig. 1. The long arm of beam $c'$ projects out beyond the back of the standard D′, and it has a number of notches in its top edge for allowing the spring-balance $f$ to be adjusted and held in any one of these notches. The spring-balance $f$ consists of a gaged portion $s$, with an eye in its upper end by which it is hung on the beam $c'$. This portion $s$ passes into the tube of the balance and is connected to the bottom of this tube by a strong spring, as shown in section, Fig. 1. The portion $s$ has a scale marked on it to indicate the amount of tension on the saw, and the bottom of the tube into which the portion $s$ passes is connected with a small roller $g$ by a strap $f'$. One end of the roller passes through the front side of the standard D′ and carries a ratchet-wheel $g'$ on it, into the teeth of which engages a dog or pawl which is pivoted to the standard D′ above the ratchet-wheel $g'$. This ratchet-wheel $g'$ has a small handle $g^2$ projecting from it, by means of which the roller $g$ may be rotated and the strap $f'$ wound upon it to increase the tension on the saw K by raising the upper belt-wheel G. The pawl engaging with ratchet-wheel $g'$ will keep the saw under the desired tension.

The saw K is an ordinary belt-saw strained over the two belt-wheels C′ and G, and receiving its motion from the lower belt-wheel C′, which is the driving-wheel. The teeth of the saw K do not project over the edges of the wheels C′ and G, but run on the peripheries of these wheels, and in order to prevent the teeth of the saw from becoming injured in consequence of their running on the wheels C′ and G, the peripheries of these wheels are covered with gutta-percha or any equivalent material which protects the teeth of the saw however tight the saw may be strained. The saw at $y$ passes down through the sliding bed-plate A² through a ∧-shaped hole in this slide, which hole allows the saw to be adjusted, as above described, to an angle of forty-five degrees with the surface of the table for sawing regular or irregular beveled work.

L is a friction-wheel with its edge or periphery covered with gutta-percha or any equivalent substance. This wheel is arranged under the table A′ in front of the saw, as shown in Figs. 1 and 2, and has its bearings in a transverse sliding bracket L′, which is acted upon by a spring $l$, and this spring $l$ keeps the periphery of the wheel L up against the teeth of the saw K and prevents the saw from being drawn forward when lumber which has been sawed is drawn backward. This rubber-surface wheel L holds the saw back, but at the same time it does not act with sufficient violence upon the teeth of the saw to injure them. The wheel L is made by cutting a deep annular groove into the edge of it and filling this groove up with rubber or gutta-percha.

Above the table A′ and behind the saw K is placed the guide-wheel I, which has its bearings in the end of the adjustable slotted arm H′, which has been described. This guide-wheel is shown in section in Fig. 3 and consists of a flange 1, with a screw-stem 2 projecting from its center, and a flange 3, with a tube projecting from its center a suitable distance, which tube is slipped on the screw-stem and forced up against a washer 4 of any required diameter and thickness, which is interposed between the two flanges 1 and 3. The whole are held together by the nut 5, which also keeps the flanges in the bearing on the end of the slotted arm H′. By constructing the guide-wheel in this way the groove between the flanges 1 and 3 may be increased in width or depth by using different-sized washers, and thus this guide-wheel may be adapted to saws of different widths to prevent the same from being twisted when used for scroll-work.

The operation of the entire machine is as follows: Motion being communicated to the main shaft B from any convenient prime mover, a rotary motion is transmitted from this shaft B through belt-wheel B′, belt $a'$, wheel $a$, and shaft C to the belt-wheel C′, under which the belt-saw passes, and the saw then receives its revolving motion in the direction indicated by the arrow in Figs. 1 and 2. The saw K is strained on the two belt-wheels C′ and G, so that it will be kept under the proper tension, without subjecting it to an under strain, in the following manner. The outer ends of the pivoted arms E E are capable of being moved either up or down and the axis of the belt-wheel G brought nearer to or set farther from the axis of wheel C′. The outer ends of arms E E are hung from the short arm of beam $c'$, the long arm of which is held down by a spring-balance $f$, which indicates by means of a scale on portion $s$ the amount of strain or tension in pounds which is applied to the long arm of the beam $c'$. The proper degree of tension is applied to the saw K by turning the roller $g$, and this degree of tension is indicated by the scale which is marked on portion s, which is drawn out of its tube to a more or less extent, according to the pressure upon the long arm of beam c'. Now it will be seen that the saw K will not be kept uniformly tight on its belt-wheels C' and G when it is warm and when it is cold, but when the saw is put under the proper degree of tension when it is cold it expands and becomes longer. When warm, the spring in the balance f will draw down the long arm of beam c' and raise the arms E E and belt-wheel G, and thus keep the saw under tension, but not under the same degree of tension as when the saw was cold. As the saw cools again the scale of balance f will indicate the same degree of tension as at first.

It will be seen that by means of the screw J the entire frame D D', which supports the upper belt-wheel G and its accessories may be moved concentrically on the shaft C and then adjusted to the position represented in red lines, Fig. 1, in which position the saw will be set to cut any irregular or straight bevel. In adjusting the saw K, as just described, the slide A², which forms a part of the table A', will be thrown back, as represented in red lines, Fig. 1, by the long curved arm of the lever D and the jointed connecting-rod b. Then when the saw is set back to its original position the slide A' will also be drawn back to its original position by the lever D and rod b.

Having thus described my invention, what I claim as new, and desire to secure by Letters Patent, is—

1. The employment, in the manner substantially as herein shown and described, of a spring-balance f to strain the saw so that as the saw expands by heating the straining pressure of the spring will decrease, all as set forth.

2. The particular arrangement of the jointed frame D D' and arm b and slide A² with the oscillating adjusting-screw J, in the manner and for the purposes herein shown and described.

3. The construction of the guide-wheel I with separately-adjustable flanges and shanks and intermediate washer, substantially in the manner and for the purposes herein shown and described.

4. The arrangement of the above peculiarly-constructed guide-wheel I with the saw K and adjustable slotted arm H', in the manner and for the purpose herein shown and described.

WM. H. SULLENBERGER.

Witnesses:
  WM. HUGHES,
  H. B. DAVISON.